United States Patent
Nakamura (10) Patent No.: US 7,422,297 B2
(45) Date of Patent: Sep. 9, 2008

(54) PRINTER

(75) Inventor: Atsushi Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 417 days.

(21) Appl. No.: 10/529,939

(22) PCT Filed: Oct. 8, 2003

(86) PCT No.: PCT/JP03/12909

§ 371 (c)(1),
(2), (4) Date: Apr. 1, 2005

(87) PCT Pub. No.: WO2004/033217

PCT Pub. Date: Apr. 22, 2004

(65) Prior Publication Data

US 2006/0284955 A1 Dec. 21, 2006

(30) Foreign Application Priority Data

Oct. 8, 2002 (JP) .............................. 2002-295040

(51) Int. Cl.
*B41J 3/00* (2006.01)
*B41J 2/195* (2006.01)
*B41J 25/308* (2006.01)
*B41J 29/38* (2006.01)

(52) U.S. Cl. .................. 347/2; 347/5; 347/8; 347/9

(58) Field of Classification Search ............ 347/2, 347/5, 8, 9, 14, 16, 19, 101, 104, 107; 358/1.11, 358/1.18; 101/35; 346/137
See application file for complete search history.

(56) References Cited

U.S. PATENT DOCUMENTS 4,113,262 A * 9/1978 DeStephanis ............. 720/641
4,138,703 A * 2/1979 Stave et al. ............... 360/133
4,352,174 A * 9/1982 Tajima et al. ............ 369/77.21

(Continued)

FOREIGN PATENT DOCUMENTS

| EP | 1 018 433 A1 | 7/2000 |
| EP | 1 108 550 A1 | 6/2001 |
| JP | 05-077528 A | 3/1993 |
| JP | 2000-246883 A | 9/2000 |

OTHER PUBLICATIONS

Japanese Office Action dated Mar. 18, 2008, issued in counterpart Japanese Application No. 2002-295040 ane English Translation thereof.

*Primary Examiner*—Stephen D. Meier
*Assistant Examiner*—Leonard S Liang
(74) *Attorney, Agent, or Firm*—Frishauf, Holtz, Goodman & Chick, P.C.

(57) ABSTRACT

A tray (3) having a setting area (6) on which an optical disc (100) is settable moves between a print position where the optical disc (100) is printable and a setting/removing position where the optical disc (100) is settable. When the tray (3) is at the print position, a printer unit (35) prints characters, etc., on the optical disc (100). An aligning member (13) is provided over the tray (3) for aligning the position and direction of a print area (P) on the optical disc (100) where printing is to be performed. The aligning member (13) is movable between an aligning position where the aligning member (13) overlaps with a surface of the setting area (6) except for the print area on which the printer unit (35) prints and a retractive position spaced from the setting area (6). When the tray (3) is moved to the setting/removing position, the aligning member (13) moves to the retractive position. Thus, after the optical disc (100) is set on the setting area (6), the aligning member (13) is moved to the aligning position to thereby align the position and direction of the print area (P) on the optical disc (100).

9 Claims, 12 Drawing Sheets

U.S. PATENT DOCUMENTS

| | | | | |
|---|---|---|---|---|
| 4,419,709 | A | * | 12/1983 | Saito et al. .................. 360/133 |
| 4,564,930 | A | * | 1/1986 | Funabashi et al. ........... 720/601 |
| 4,627,037 | A | * | 12/1986 | Tamaru et al. .............. 720/633 |
| 5,927,208 | A | * | 7/1999 | Hagstrom et al. ........... 101/486 |
| 6,148,722 | A | | 11/2000 | Hagstrom |
| 6,202,550 | B1 | | 3/2001 | Lee et al. |
| 6,312,174 | B1 | * | 11/2001 | Drynkin et al. ........ 400/120.16 |
| 6,320,835 | B1 | * | 11/2001 | Kamei ........................ 720/653 |
| 6,345,035 | B1 | * | 2/2002 | Aoki et al. ................... 720/720 |
| 2002/0110399 | A1 | * | 8/2002 | Murata .................... 400/615.2 |

* cited by examiner

PRINTER

This application is a U.S. National Phase Application under 35 USC 371 of International Application PCT/JP2003/12909 filed Oct. 8, 2003.

TECHNICAL FIELD

The present invention relates to printers that print information such as a title on a recording medium, for example, a CD-R (Compact Disc Recordable), a CD-RW (Compact Disc ReWritable) or a DVD-R (Digital Versatile Disc recordable) on which data under the title has been recorded.

BACKGROUND ART

In the past, Japanese Patent Publication JP 2000-246883 has disclosed a printer that prints a title of characters on an optical disc (recording medium) such as a CD-R.

Generally, commodity information including, for example, a character string "CD-R" has been printed beforehand by its manufacturer on a specified area of an optical disc such as a CD-R. Preferably, a user prints a title of characters on the optical disc outside a print area for the commodity information so that the title is parallel to and alongside the character string indicative of the commodity information.

The above mentioned prior art printer has the function of printing a title of characters on an optical disc such as CD-R so as to be parallel to and alongside the character string indicative of the commodity information printed beforehand on the optical disc.

To this end, the prior art printer comprises a tray sliding mechanism that moves into and out of the printer body a tray on which the optical disc is set horizontally, a printing mechanism that moves a printing head in the direction perpendicular to the moving direction of the tray to thereby print on the optical disc set on the tray received within the printer body, and a camera that picks up an image on a surface of the optical disc.

The prior art printer senses an angular position of the optical disc on the tray based upon the image of the optical disc picked up by the camera. When it is sensed that the optical disc is rotated through a specified angle from a reference angular position on the tray, the character string of the title to be printed is rotated through the specified angle and then printed on the optical disc in order to print on the disc the character string of the title parallel to that of the commodity information.

In this printer, when the extending direction of the character string of the commodity information printed beforehand on the optical disc set on the tray, perpendicular or parallel to the moving direction of the tray, is defined as a reference angular position.

In this printer, the angular position of the optical disc on the tray is sensed by obtaining an angle (quantity of rotation) of the character string indicative of the commodity information to the reference direction based upon the image data on the optical disc set on the tray. The character string of the title is rotated through the obtained angle, and then printed based upon data on the rotated character string so that the character string of the title is parallel to that of the commodity information.

Therefore, according to the prior art printer, even when the user sets the optical disc on the tray in any angular position and not in a predetermined reference angular position, the character string of the title is printed in the same direction as and alongside the character string indicative of the commodity information, which is convenient for the user.

In the prior art printer, however, a camera is required that picks up an image of the surface of the optical disc to sense the angular position of the optical disc on the tray. A quantity of rotation of the optical disc needs to be sensed based upon the image data obtained from the camera. In addition, rotation of the character string of the title is required based upon the sensed quantity of rotation. This renders the composition of the printer complicated and increases the cost.

DISCLOSURE OF THE INVENTION

It is therefore an object of the present invention to provide a printer for a recording medium and having a simple structure capable of easily aligning the position and direction of a print area on the recording medium to thereby reduce the cost of the printer.

In order to achieve the above object, according to the present invention there is provided a printer comprising supporting means having a setting area on which a data recording medium is settable, the supporting means being movable between a print position where printing is possible on the recording medium set on the setting area thereof and a setting/removing position where the recording medium is settable/removable, and printing means for printing on a predetermined area of the recording medium set on the setting area of the supporting means when the supporting means that supports the recording medium is at the print position, the printer being characterized by:

an aligning member movable between an aligning position where the aligning member overlaps with a surface of the setting area except for at least the predetermined area on the recording medium and a retractive position to which the aligning member has retracted from the surface of the setting area, the aligning member aligning at the aligning position the position and direction of a print area of the recording medium set on the setting area on which the printing means should print, the aligning member moving from the aligning position to the retractive position as the supporting means moves from the print position to the setting/removing position, and being movable from the retractive position to the aligning position.

According to this arrangement, the position and direction of the print area on the recording medium can be aligned with respective predetermined references by using the aligning member of a simple structure without using a complicated mechanism including a camera, and a string of desired characters can be then printed on the print area by the printing means. Since the aligning member can be disposed so as to overlap with the surface of the recording medium except for the print area, the print area can be printed by the printing means with the aligning member being disposed over the recording medium.

In the above arrangement, the aligning member may be slidable relative to the supporting means between the aligning position and the retractive position. The aligning member may comprise an engaging element engageable with a printer body when the supporting means moves from the print position toward the setting/removing position to thereby stop the movement of the aligning member, and disengaged from the printer body as the engaging member moves relative to the aligning member when the supporting means is at the setting/removing position.

According to this arrangement, the engaging element is engaged with the printer body to thereby stop the movement of the aligning member when the supporting means moves from the print position toward the setting/removing position. Thus, when the supporting means is at the setting/removing position, the whole surface of the setting area on the supporting means is opened. Therefore, a recording medium can be set on the setting area of the supporting means. Then, the aligning member can be moved to over the setting area on the supporting means, and the position and direction of the print area on the recording medium can then be aligned.

In the above arrangement, the engaging element may take the form of an elastic leaf spring engageable with the printer body.

In the above arrangement, the aligning member may be made of an optically transparent material.

According to this arrangement, since the aligning member may be made of an optically transparent material, the print area on the recording medium can be aligned, for example, with a print of commodity information formed beforehand on the recording medium, by viewing the print as a reference through the transparent aligning member with the aligning member superposed over the recording medium.

In the above arrangement, the aligning member may have thereon an indicator as a reference for alignment of the position and direction of the print area on the recording medium.

According to this arrangement, the print area on the recording medium can be easily and accurately aligned, using as the reference the indicator formed on the aligning member.

The indicator preferably comprises vertical, horizontal and/or inclined line segments, the inclined line segment being inclined at a predetermined angle to the vertical or horizontal.

In the above arrangement, the aligning member may be made of an optically transparent material and having an aligning portion with an indicator formed thereon, the aligning portion being disposed at a specified position of a print on the recording medium formed beforehand by the manufacturer or in the vicinity of the specified position when the aligning member has moved to the aligning position, the indicator being a reference for aligning the position and direction of the print area on the recording medium.

According to this arrangement, the optically transparent aligning portion with the indicator formed thereon can be disposed at the specified position of the print on the recording medium formed beforehand by the manufacturer or in the vicinity of the specified position to thereby allow the print area on the recording medium to be easily aligned.

These and other objects, features and advantages of the present invention will become more apparent in light of the following detailed description of a best mode embodiment thereof, as illustrated in the accompanying drawings.

BEST MODE FOR CARRYING OUT THE INVENTION

An embodiment of the present invention will be described next with the accompanying drawings.

Figure 1:
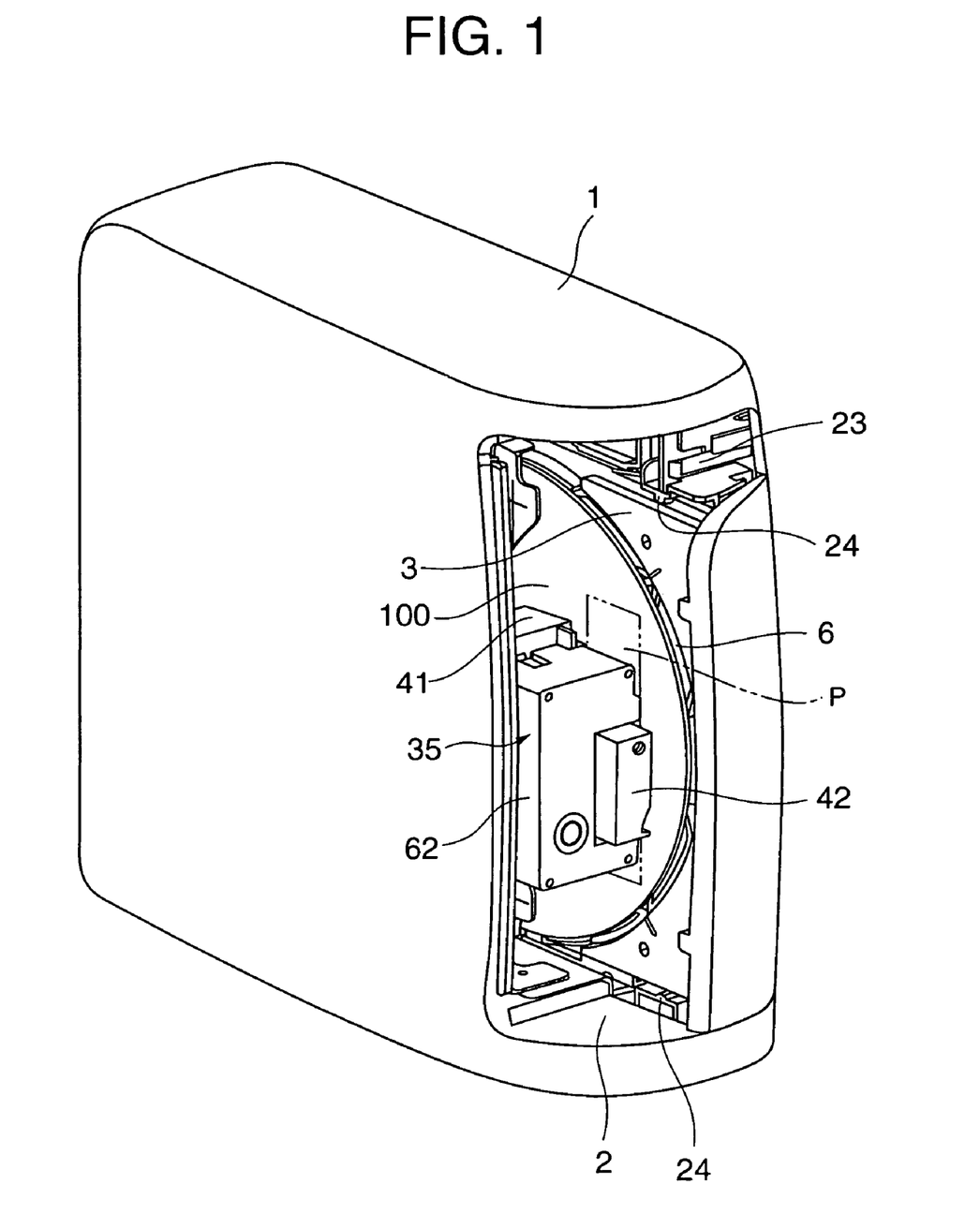
FIG. 1 is a perspective view of a printer in which the tray is retracted as an embodiment of the present invention.
Figure 2:
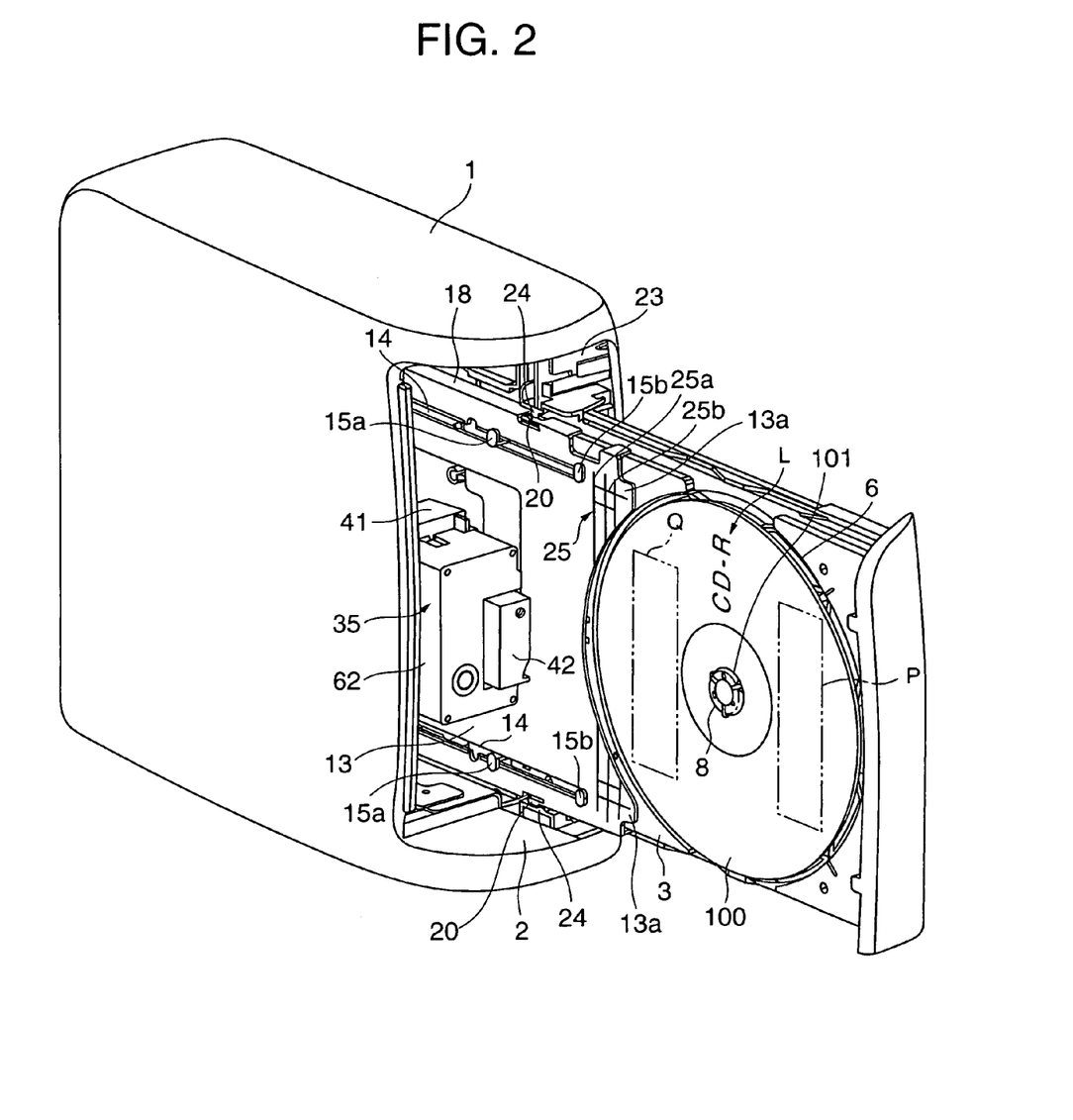
FIG. 2 is a perspective view of the printer from which the tray is thrusted out.
Figure 3:
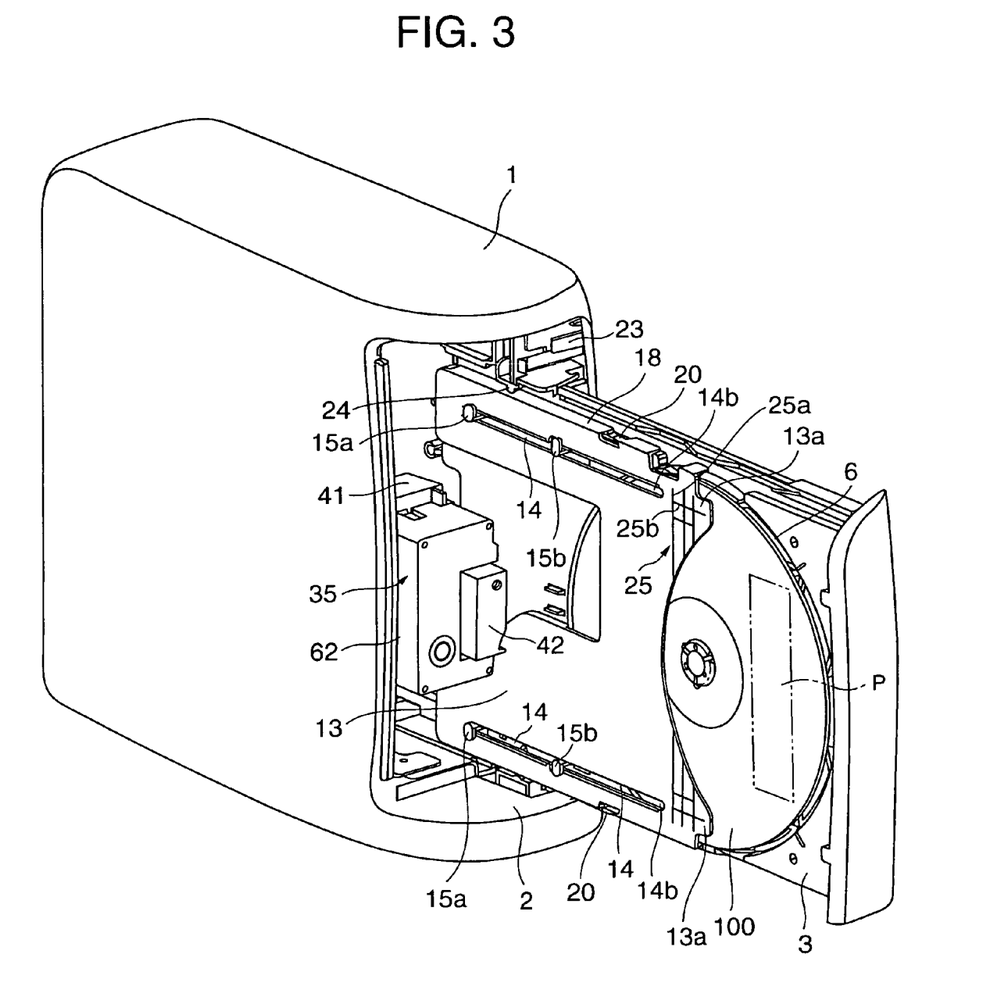
FIG. 3 is a perspective view of the printer in which an optical disc is aligned in a state where the tray is thrusted out.
Figure 4:
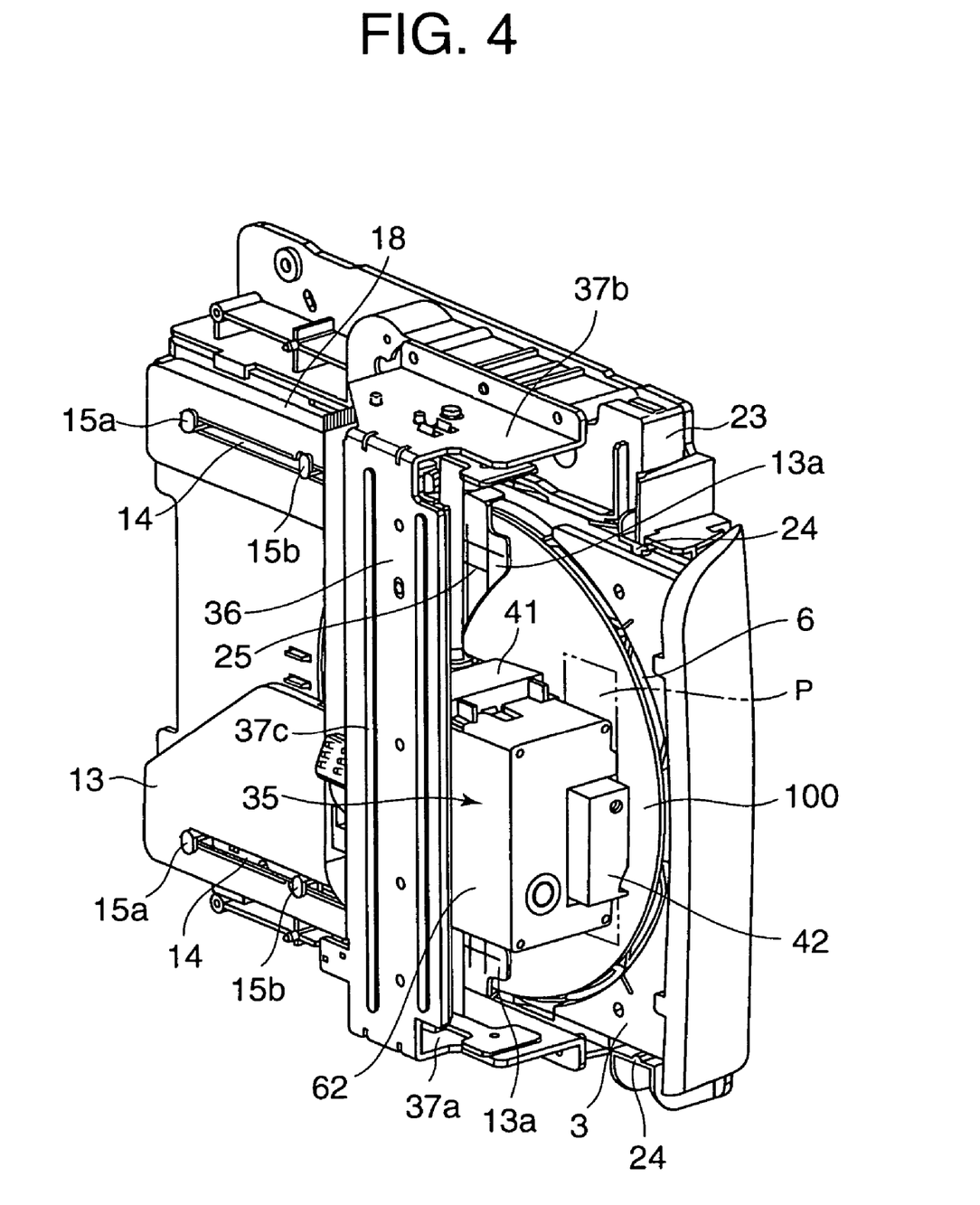
FIG. 4 is a perspective view of a main internal mechanism of the printer in which the tray is retracted.
Figure 5:
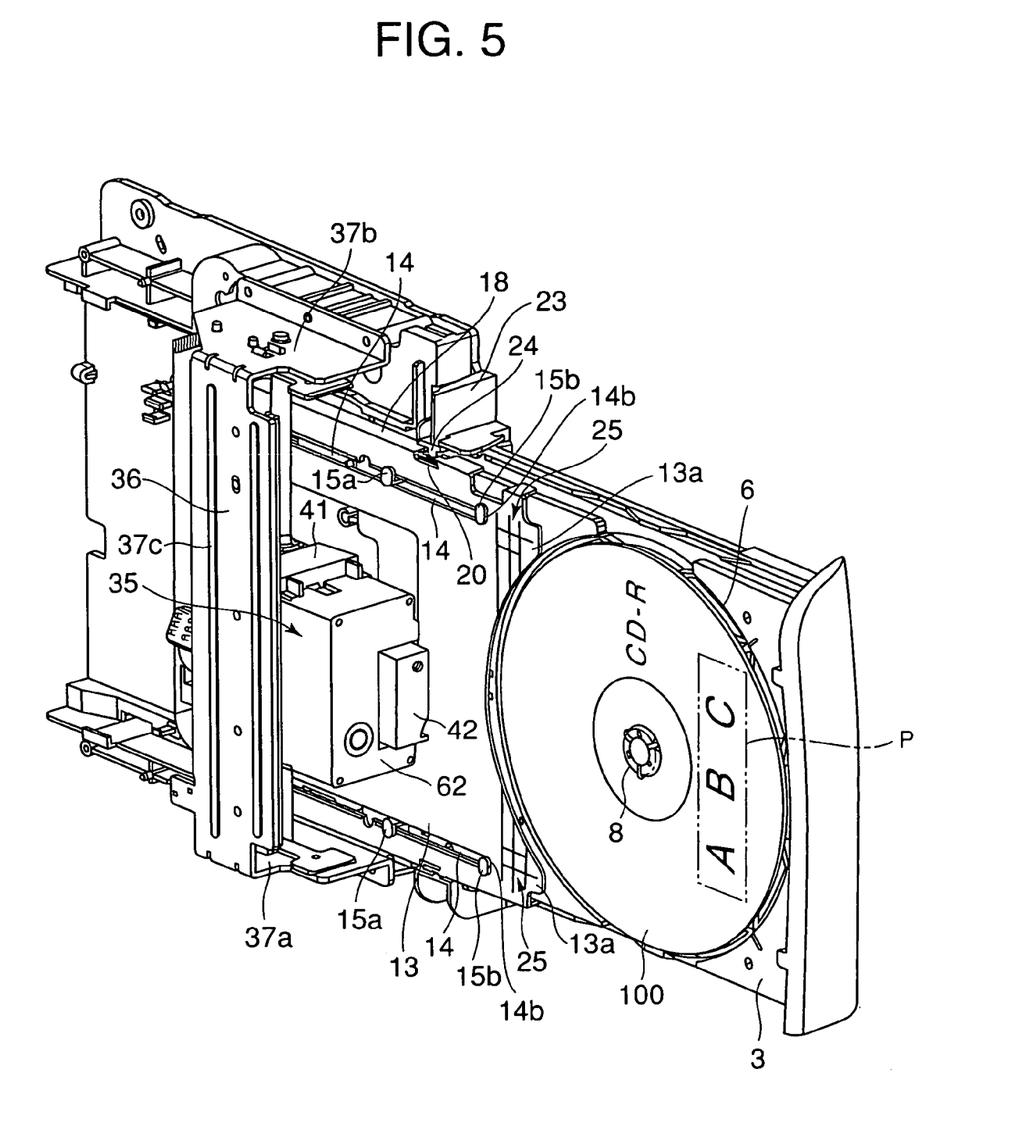
FIG. 5 is a perspective view of the main internal mechanism of the printer from which the tray is thrusted out.
Figure 6:
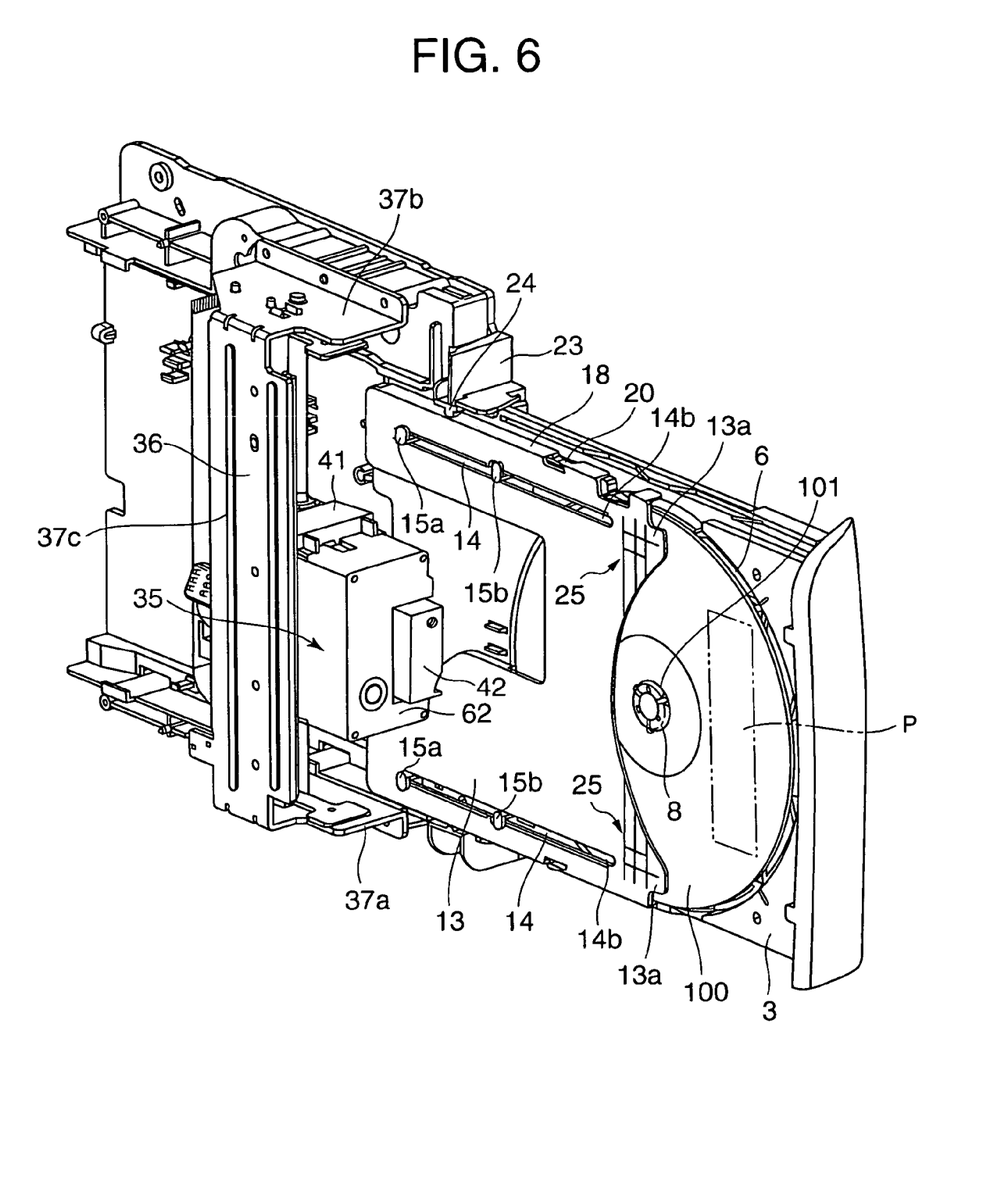
FIG. 6 is a perspective view of the main internal mechanism when the optical disc is aligned in a state where the tray is thrusted out.

FIGS. 1-3 show the whole printer that prints on an optical disc (recording medium) such as a CD-R on which data is recordable. FIGS. 4-6 show the main internal mechanism of the printer.

The printer comprises a case 1 as a part of its body in substantially the form of a box of relatively thin plastic material. As shown in FIGS. 1-3, the printer is used in a state where it is set, for example, erect on a table.

The case 1 has an opening 2 at its front with an openable cover (not shown) for the opening 2. A tray 3 as supporting means on which an optical disc 100 such as a CD-R is set is received erect within the case 1.

The tray 3 is arranged to move between a print position where the whole tray 3 is received within the case 1 to thereby allow the optical disc 100 to be printed and a setting/removing position spaced a predetermined distance forward from the opening 2 in the case 1 to which setting/removing position the tray is thrusted out to allow the optical disc 100 to be set there.

The movement of the tray 3 from the print position to the setting/removing position is performed by a tray drive mechanism (not shown) that is driven by pushing an ink jet button (not shown). The movement of the tray 3 from the setting/removing position to the print position is also performed by the tray drive mechanism that is driven by pushing the ink jet button again or by pushing the tray 3 into the case 1 manually.

As will be described more specifically later, the tray drive mechanism comprises within the case 1 a motor that acts as a drive source, a drive gear driven by the motor, and a rack provided on the tray meshing with the drive gear. The tray is moved between the print position and the setting/removing position by driving the motor forwardly or backwardly in response to the operation of the ink jet button.

The tray 3 has a circular setting area 6 on which the optical disc 100 is settable. FIGS. 1-6 show the optical disc 100 set on the setting area 6. The setting area 6 has thereon a rubber member (not shown) that supports thereon the optical disc 100 and that acts as a slip preventer and a cushion for the optical disc 100, and a protrusion 8 that is engageable in a central hole 101 in the optical disc 100 to position the optical disc 100. The rubber member composes a platen provided for a printer unit 35 to be described later. The rubber member is disposed at a position on the setting area 6 corresponding to a range in which a thermal head 42 of the printer unit 35 moves so as to stop a pressure that the optical disc 100 receives from the thermal head 42.

An aligning member 13 is attached slidably to the tray 3. The aligning member 13 is made of an optically transparent material (transparent or translucent plastic material). An elongated guide groove 14 is provided in the aligning member 13, extending along each of its sides in the moving direction of the tray 3. A pair of guide pins 15a and 15b is provided on the tray 3 so as to be received within each guide groove 14 in the aligning member 13 such that the aligning member 13 slides in the moving direction of the tray 3.

As will be described later, the aligning member 13 is arranged to slide on the tray 3 between the aligning position and a retracted position. The length of the respective guide grooves 14 and the distance between the two guide pins 15a and 15b received within each guide groove 14 are set such that the aligning member 13 is movable between the aligning position and the retracted position.

Figure 7:
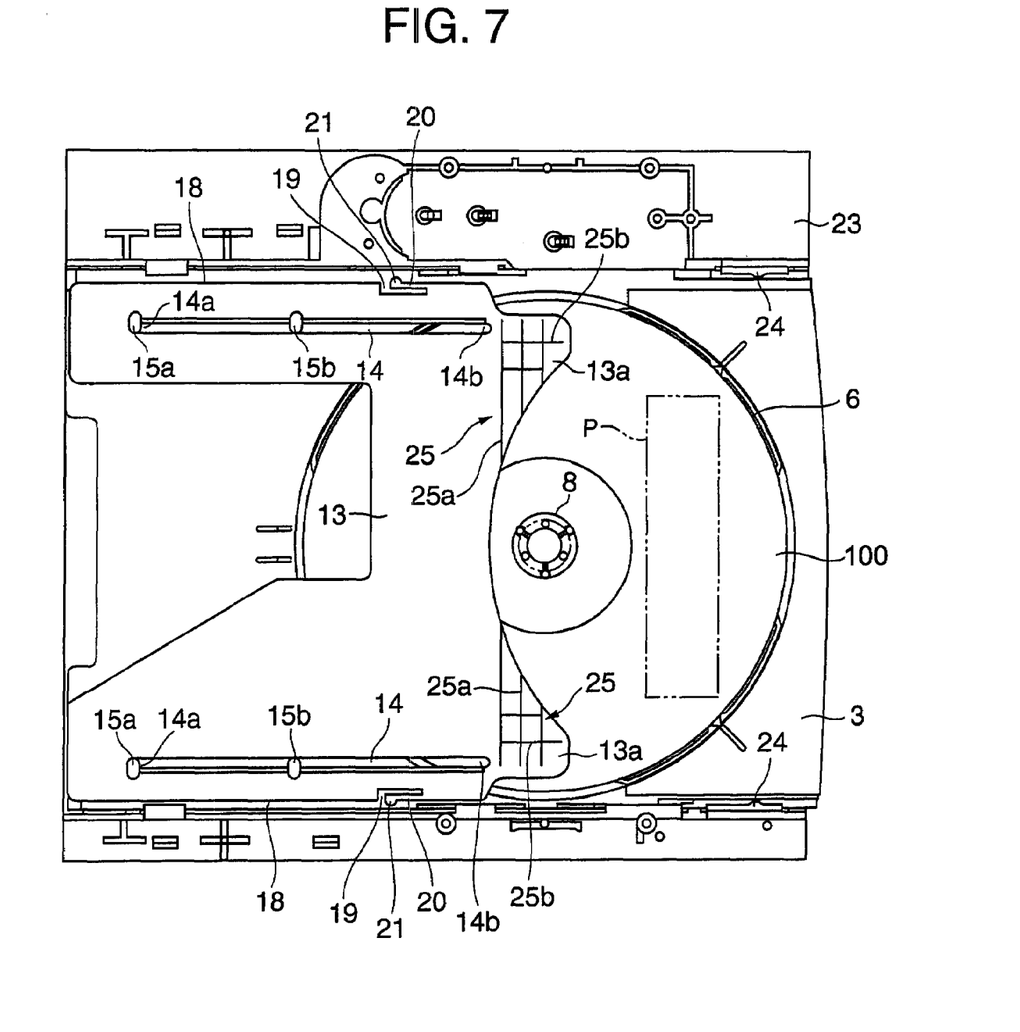
FIG. 7 is a side view of the tray and an aligning member of the printer.

FIG. 7 is a side view of the tray 3 and the aligning member 13. A side strip 18 that is superposed on each side edge of the tray 3 is formed integral with each edge of the aligning member 13. Each side strip 18 has a cut 19 such that a leaf spring-like engaging member 20 extends from a part of an edge of the cut 19 so as to close the cut with the engaging element 20 having a protruding pawl 21 at its tip.

The case 1 has enclosed a base 23 that constitutes the body along with the case 1 with the base 23 supporting the tray 3 slidable. The base 23 has a pair of protrusions 24, each engageable with a respective one of the upper and lower pawls 21 of the engaging element 20 as the aligning member 13 slides. The pair of protrusions 24 is provided in the vicinity of the opening 2 in the base 23 (FIG. 1).

As will be seen in FIG. 7, the aligning member 13 has an arcuately concave right-hand end, both the extremities of which form corresponding aligning portions 13a protruding rightward. Each of the aligning portions 13a is marked with an indicator 25 of vertical and horizontal reference straight line segments 25a and 25b that offer an aligning reference for the position and direction of a print range on the optical disc 100 to be printed when the optical disc 100 is set on the setting area 6 on the tray 3. The vertical reference straight line segments 25a extend in a vertical direction of the printer body and parallel to the length of a print area P to be given by the printer unit 35. The horizontal reference straight-line segments 25b are perpendicular to the vertical reference straight-line segments 25a.

As described above, the tray 3 moves between the print position within the case 1 and the setting/removing position where the tray 3 is thrusted out from the case 1. The aligning member 13 provided on the tray 3 moves between an aligning position where both the aligning portions 13a overlap with the setting area 6 on the tray 3 except for the print area P and a retractive position where the aligning portions 13a retract from above the setting area 6 on the tray 3 toward the rear end of the tray 3 to thereby expose the whole surface of the setting area 6. The aligning portions 13a are attached to the tray 3 such that a predetermined gap is formed between the setting area 6 and the aligning portions 13a to thereby prevent the aligning member including the aligning portions 13a from coming into contact with the optical disc 100 set on the setting area 6 when the aligning portions 13a move over the tray 3.

The printer unit 35 is provided within the case 1 and includes a thermal transfer printer as printing means that faces the disc setting area of the tray 3.

The printer unit 35 has a bridge-shaped frame 36, which has a pair of legs 37a and 37b, each provided at a respective end thereof and fixed to the base 23 within the case 1 (FIGS. 4-6, 8). A vertical frame 37c extending between the pair of legs 37a and 37b is disposed at a position spaced forward of the case 1 from the center of the setting area 6 when the tray 3 is disposed at the print position.

Figure 8:
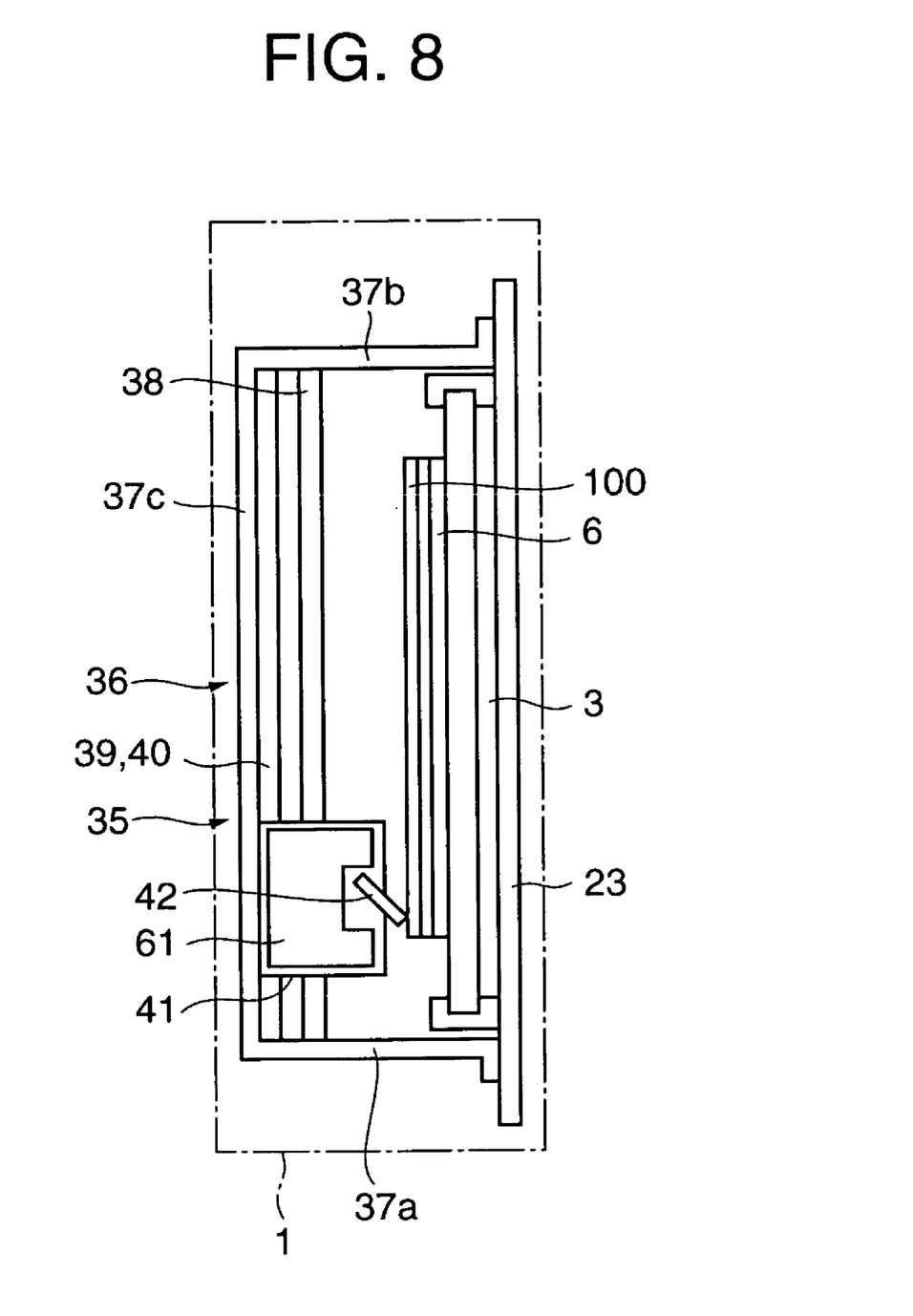
FIG. 8 is a front view of the internal structure of the printer.

As shown in FIG. 8, the printer frame 36 supports a carriage 41 on which the thermal head 42 is supported. The printer frame 36 also forms a vertical path through which the carriage 41 moves along the setting area 6. A guide shaft 38 that slidably guides the carriage 41 is provided parallel to the vertical frame 37c. A rack 39 meshing with a drive gear 44 provided on the carriage 41 in FIG. 9 when the carriage 41 moves along the vertical frame 37c while facing the setting area 6 of the tray 3, and a guide rail 40 that guides the carriage 41 are also provided.

The carriage 41 is of a self-driving type in which a carriage motor 43 comprising a stepping motor provided on the carriage 41 drives the drive gear 44 (FIG. 9) to thereby move the carriage 41 along the rack 39 in one direction and vice versa.

Figure 9:
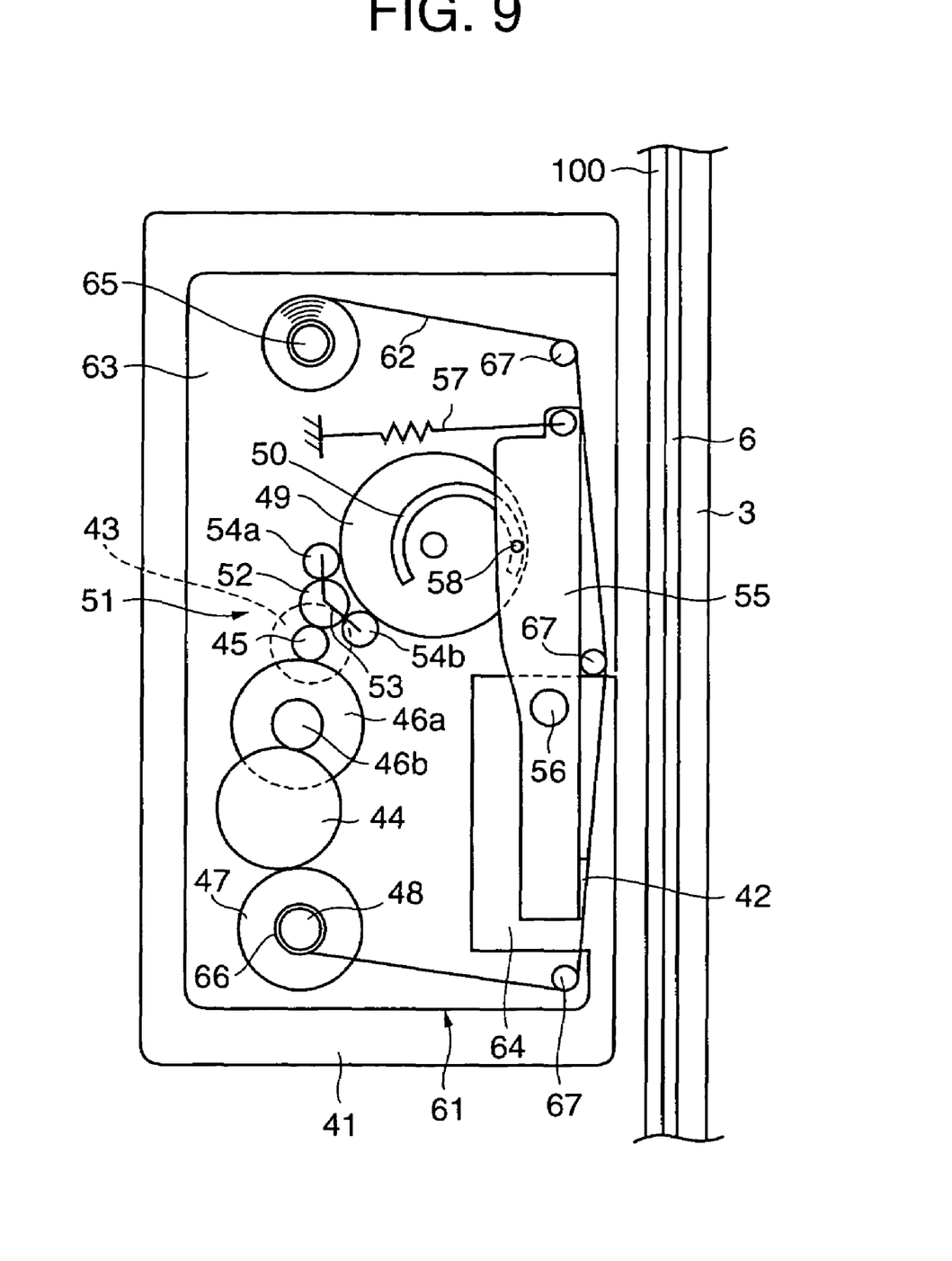
FIG. 9 schematically illustrates the internal structure of the printer that includes a carriage and a ribbon cartridge.
Figure 10:
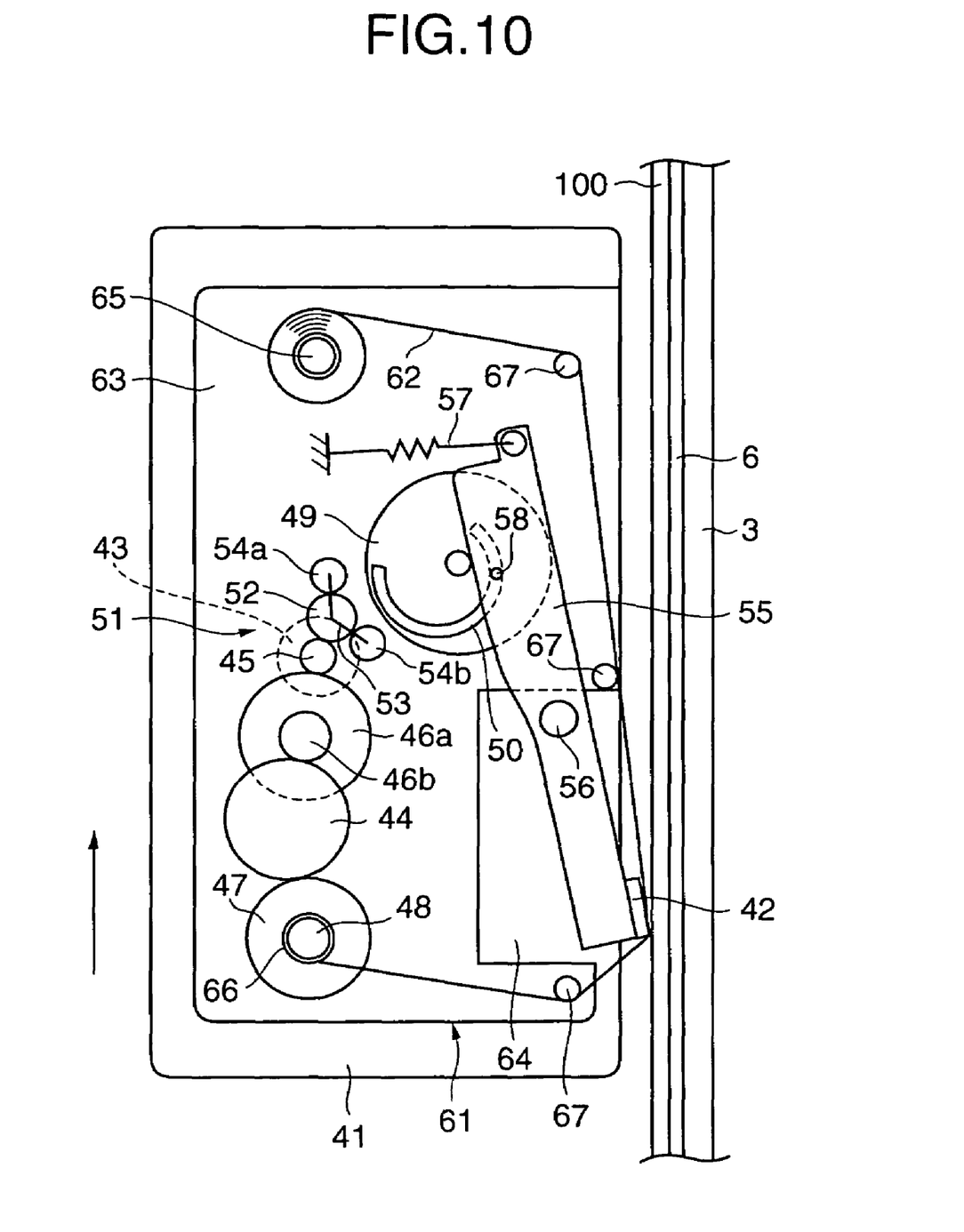
FIG. 10 schematically illustrates the carriage and ribbon cartridge of the printer in printing.

Refferring to FIGS. 8-10, the structure of the carriage will be described in more detail next.

A ribbon cartridge 61 that contains an ink ribbon 62 for thermal transfer printing is provided at the front of the carriage 41. The ribbon cartridge 61 is replaceable with another by opening the printer cover (not shown) provided at the front of the case 1.

The thermal head 42 is provided at the front of the carriage 41. Provided within the carriage 41 are a drive mechanism for the carriage 41, a head moving mechanism for the thermal head 42 and a winding mechanism for the ink ribbon 62. The carriage motor 43 is a reversible drive source for the respective mechanisms and is attached to a back of the carriage 41.

The ribbon cartridge 61 settable at the front of the carriage 41 includes a case 63, which has a concavity 64 that receives the thermal head 42. Provided within the case 63 are a ribbon feed core 65 and a ribbon winding core 66. An ink ribbon 62, wound around the ribbon feed core 65, is fed out and guided through a plurality of guide pins 67 and the concave 64 in which the thermal head 62 is received, and then wound around the winding core 66.

An output gear 45 is attached to an output shaft of the carriage motor 43 within the carriage 41. The output gear 45 meshes with a larger one 46a of a two-speed gear whose smaller one 46b meshes with a drive gear 44, which in turn meshes with the rack 39. The drive gear 44 then meshes with a ribbon winding gear 47 whose rotational shaft is connected through a one-way clutch (not shown) to a ribbon winding shaft 48. The ribbon-winding shaft 48 protrudes toward the front of the carriage 41 to engage the winding core 66 of the ribbon cartridge 61.

A cam gear 49 is provided within the carriage 41 and has an eccentric arcuate cam groove 50. An oscillating clutch 51 is provided between the cam gear 49 and the output gear 45. The oscillating clutch 51 comprises a sun gear 52 meshing with the output gear 45, and a pair of planet gears 54a, 54b meshable with the sun gear 52 and supported movable along the periphery of the sun gear 52 through an arm 53. When the sum gear 52 rotates forwardly or clockwise, one planet gear 54a meshes with the cam gear 49 and the other planet gear 54b moves away from the cam gear 49. When the sun gear 52 rotates reversely or counterclockwise, the one planet gear 54a moves away from the cam gear 49 and the other planet gear 54b comes into meshing with the cam gear 49.

A head arm 55 to which the thermal head 42 is attached is provided rotatable around a shaft 56 within the carriage 41. The head arm 55 is pulled counterclockwise by a spring 57 provided at one end thereof. The head arm 55 has in the vicinity of its end a pin 58 received slidable within the cam groove 50 in the cam gear 49.

Operation of the printer unit 35 will be described next. First, as shown in FIG. 8, the carriage 41 is at its home position set in the vicinity of a lower end of the vertical path therefore when the printer unit 35 stands ready for a printing operation (that is, when the tray 3 is disposed at the print position within the case 1 and the optical disc 100 is set on the setting area 6). As shown in FIG. 9, the thermal head 42 is at a print wait position spaced from a surface of the optical disc 100.

When the motor 43 is forwardly driven in this state, the output gear 45 is driven counterclockwise. Thus, the drive gear 44 meshing with the rack 39 is driven counterclockwise to move the carriage 41 upward along the guide shaft 38 and the guide rail 40. The ribbon winding gear 47 is rotated and the ribbon-winding shaft 48 is rotated so as to wind around the winding core 66 the ink ribbon 62 fed out from the feed core 65.

In parallel with this operation, the sun gear 52 of the oscillating clutch 51 that meshes with the output gear 45 is rotated. Thus, the one planet gear 54a comes into meshing with the cam gear 49, so that the torque of the sun gear 52 is transmitted to the cam gear 49 to thereby rotate the same clockwise. In addition, the head arm 55 is turned counterclockwise around the shaft 56 to thereby bring its head to the print position, as shown in FIG. 10.

The cam gear 49 has a cut (not shown) along its periphery. When the cam gear 49 has rotated through a specified angle, the planet gear 54a falls into and idles in the cut to thereby hold the thermal head 42 at the print position.

When the carriage motor 43 is further driven forwardly, the carriage 41 moves upward along its path while winding the ink ribbon 62 with the thermal head 42 being held at the print position because the planet gear 54a is in the cut. Simultaneously with the movement of the carriage 41 and the winding of the ink ribbon 62, the heaters of the thermal head 42 produce heat based upon the printing data to thereby melt the inks in the ink ribbon 62. The melted inks are then thermally transferred to a surface of the optical disc 100 to thereby print, for example, a title to a predetermined print area of the surface of the optical disc 100 corresponding to the moving range of the thermal head 42.

When the carriage 41 moves to an upper end of the moving range and then terminates the printing operation, the motor 43 is then driven reversely to thereby rotate the output gear 45 reversely (counterclockwise). Thus, the drive gear 44 is also rotated clockwise and the carriage 41 starts to move downward to its home position along the guide shaft 38 and the guide rail 40.

At this time, since the ribbon winding gear 47 is connected to the ribbon winding shaft 48 through the one-way clutch, no torque is transmitted to the ribbon winding shaft 48. Simultaneously, the reverse rotation of the output gear 45 causes the sun gear 52 of the oscillating clutch 51 to rotate reversely to thereby move the one planet gear 54a away from the cam gear 49 and causes the other planet gear 54b to come into meshing with the cam gear 49. This causes the torque of the sun gear 52 to be transmitted to the cam gear 49 to thereby rotate this gear counterclockwise.

The reverse rotation of this cam gear 49 causes the head arm 55 to rotate clockwise around the shaft 56 to so as to bring the head to the print wait position. As described above, the cam 49 has the cut (not shown) along its periphery in correspondence to the planet gear 54b. Thus, when the cam gear 49 is rotated through a specified angle to thereby return the thermal head 42 to the print wait position, the planet gear 54b falls into and idles in the cut.

After the planet gear 54b has fallen in the cut, the reverse rotation of the motor 43 causes only the carriage 41 to move toward its home position with the thermal head 42 being held at the print wait position.

A strip-like area P on the tray 3 (optical disc 100) of FIGS. 1-7 represents a print area where the printer unit 35 is printable. The print area P is somewhat deviated forwardly from the center of the setting area 6 on the tray 3 which is at the print position where the tray 3 is received within the case 1. A shorter side of the strip-like print area P corresponds to a width of the array of heaters of the thermal head 42 whereas a longer side of the print area P corresponds to the distance through which the thermal head 42 moves.

The printer has a power source jack and a USB jack (not shown). When the printer is used, the power cable is connected to the power source jack to feed power to the printer. In addition, the USB cable is inserted into the USB jack to connect the printer to a personal computer.

Then, the eject button is pressed to cause the tray 3 to be thrusted out from the case 1 to thereby cause the setting area 6 to be exposed outside the case 1 and hence allow the tray 3 to be disposed at a position where the optical disc 100 is settable (FIGS. 2 and 5).

When the tray 3 is received within the case 1, or disposed at the print position, the aligning member 13 is disposed at an aligning position where the aligning member 13 covers substantially half of the setting area 6 on the tray 3.

Figure 11A:
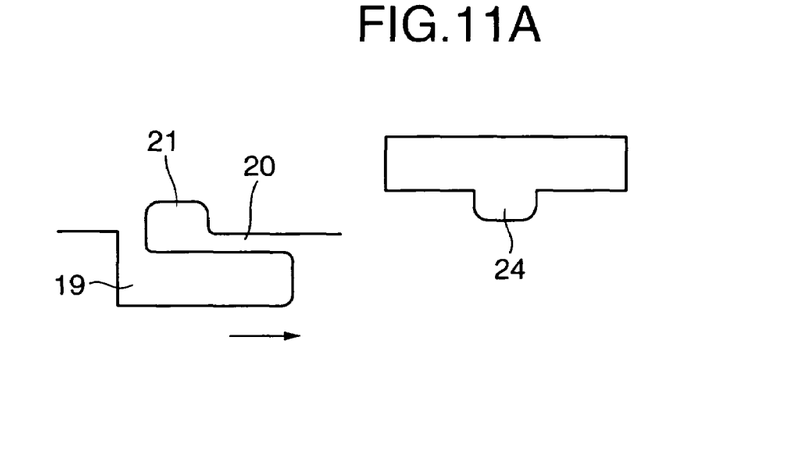
FIGS. 11A to 11C illustrate an engaging mechanism of the aligning member when the tray is moved.
Figure 11B:
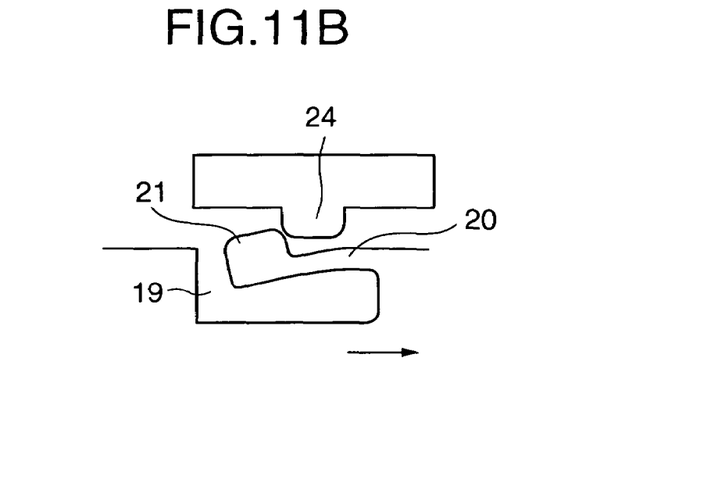

When the tray drive mechanism causes the tray 3 to be thrusted out, the aligning member 13 moves together with the tray 3 so that the pawls 21 of the upper and lower leaf spring-like engaging elements 20 engage the corresponding engaging protrusions 24 provided in the vicinity of the opening 2 in the base 23 during the movement of the aligning member 13. Thus, this stops the aligning member 13 and only the tray 3 moves in the thrusting out direction (FIGS. 11A, 11B).

In other words, when the tray 3 is assumed as a reference, the aligning member 13 moves relative to the tray 3 from the aligning position where the aligning member 13 aligns with the tray 3 to the retractive position due to engagement of the pawls 21 of the upper and lower engaging elements 20 with the corresponding upper and lower engaging protrusions 24 of the base 23. As the aligning member 13 moves to the retractive position, the whole surface of the setting area 6 on the tray 3 is opened.

Thus, in this state an optical disc 100 is fitted at its central hole 101 over the protrusion 8 on the setting area 6 of the tray 3. Thereafter, the user draws the aligning member 13 with his or her fingers in the direction in which the tray is thrusted out to thereby move the aligning member 13 to the aligning position (FIGS. 3 and 6).

When the aligning member 13 is drawn manually, the upper and lower leaf spring-like engaging elements 20 are deformed elastically into the corresponding cuts 19 by the drawing force, and the pawls 21 then move over the respective upper and lower engaging protrusions 24 toward the front side of the printer. Thus, the pawls 21 are disengaged from the corresponding engaging protrusions 24, so that the aligning member 13 is moved from the opening 2 to the outside of the printer. FIGS. 11A and 11B show a relationship in position between each engaging element 20 and the corresponding engaging protrusion 24 when the tray 3 is thrusted out.

When the aligning member 13 moves to the aligning position, its two aligning members 13a overlap with, or partially covers, the optical disc 100.

At the aligning position, the rear ends of the upper and lower guide grooves 14a provided in the aligning member 13 abut on the corresponding upper and lower guide pins 15 received in the guide grooves 14 nearer the rear of the printer, and hence the movement of the aligning member 13 in the thrusting-out direction is stopped (FIG. 3).

Generally, commodity information is beforehand printed on the optical disc (CD-R) 100 by the manufacturer. FIG. 2 illustrates that a character string "CD-R" is printed as commodity information L on the optical disc. Such a print L is generally formed at a position such as is shown in FIG. 2 and/or at a position on the opposite side of the central hole 101 in the optical disc 100 from the former position on the optical disc. The area designated by reference character P or a second area designated by reference numeral Q on the opposite side of the central hole 101 in the optical disc 100 from the former position is ensured as a space where the user can notate, for example, a title of characters by handwriting or printing on the optical disc.

In the inventive printer when the aligning member 13 is moved to the aligning position, its aligning portions 13a are preferably disposed so as to overlap with, or be in the vicinity of, the print L on the optical disc 100 disposed.

After the aligning portions 13a have overlapped with the surface of the optical disc 100, the optical disc 100 is turned by applying a finger force to a part of the periphery thereof so that as shown substantially shown in FIG. 3, the aligning portion 13a concerned substantially overlaps with the print L formed beforehand on the optical disc 100, and a print area P on which the printer unit 35 prints is exposed at a position spaced forwardly (or right in FIG. 3) from the center of the disc 100.

Then, the print L on the optical disc 100 is viewed through the transparent aligning portion 13a concerned to thereby adjust a quantity of rotation of the optical disc 100 such that the vertical straight line segments 25a of the indicator 25 become parallel to the direction of the character string "CD-R" as the print L.

After this aligning, the tray 3 is retracted manually into the case 1 to thereby place the tray 3 at the print position (FIGS. 1 and 4).

Figure 11C:
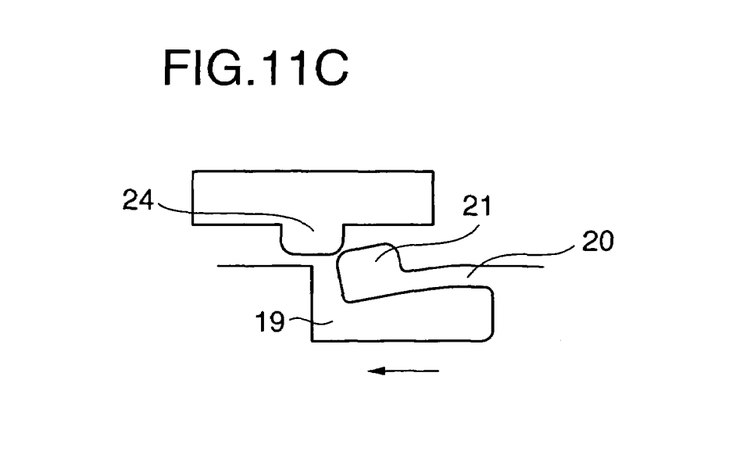

When the tray 3 moves into the case 1, the upper and lower guide grooves 14 provided in the aligning member 13 hit at their forward ends 14b on the corresponding nearer guide pins 15b received in the guide grooves 14 so that the aligning member 13 moves along with the tray 3 thereafter. Thus, the engaging elements 20 of the aligning member 13 hit on the corresponding engaging protrusions 24 of the printer body to thereby cause the engaging elements 20 to be bent elastically into the corresponding cuts 19. Thus, the engaging protrusions 24 are disengaged from the corresponding pawls 21, so that the tray 3 moves to the print position within the case 1 with the aligning member 13 maintained at the aligning position. FIG. 11C shows a positional relationship between each engaging element 20 and the corresponding engaging protrusion 24 when the tray 3 moves into the case 1.

A title of character string to be printed is then specified based upon a dedicated title print application set on the personal computer, which is then instructed to start printing. In response to this instruction, the computer prints the title of character string on the print area P on the optical disc 100.

In printing, the movement of the carriage 41 and the winding up of the ink ribbon 62 are performed simultaneously, as described above. At this time, the heaters of the thermal head 42 produce heat based upon the printing data to thereby melt the ink in the ink ribbon 62 and then print the character string by thermal transfer in the moving direction of the carriage 41 in the print area P on the optical disc 100.

The carriage 41 moves in the direction parallel to the vertical ruled line or reference straight line segments 25a of the indicator 25 marked on the aligning portion 13a of the aligning member 13. Thus, characters and symbols which will be printed in the print area P on the optical disc 100 are parallel to the print L.

In summary, the optical disc 100 is set so as to take a predetermined position and a predetermined direction on the setting area 6 of the tray 3, using the aligning member 13, and then printed. Thus, the direction of arrangement of the characters and symbols to be printed coincides exactly with the direction of extension of the print L. Thus, attractive print is performed on the optical disc 100.

FIG. 5 illustrates a character string "ABC" printed on the print area P on the optical disc 100. As shown, the character string can be printed in the print area P parallel to the character string of the print L.

In this printer, printing is possible at a plurality of places on the same optical disc. For example, after a first character string has been printed on the print area P of the optical disc 100 of FIG. 2, a second character string can be printed on a different area Q on the same optical disc parallel to the first character string on the optical disc 100. In this case, the optical disc 100 is turned through about 180 degrees by applying the user's finger force to the periphery of the optical disc 100 set on the tray 3, and then more minutely adjust the rotational angle of the optical disc 100 such that the optical disc substantially aligns with the reference position, using the alighing portion 13a.

Thus, well-balanced impressive print is provided in which the first and second printed character strings are arranged parallel to each other.

While the aligning member 13 is illustrated as supported slidable by the tray 3, it may be provided in position within the case 1 so as to slide over the tray 3 as the tray 3 moves. The aligning member 13 may be made of an opaque or translucent material in addition to the transparent material.

While in the embodiment the setting area 6 of the tray 3 on which the optical disc 100 is set is illustrated as formed integral with the upper surface of the tray 3, arrangement may be such that the setting area 6 is provided as a separate turn table above the tray 3 and that the tray 3 has a drive mechanism provided thereon to thereby turn the turn table through only a predetermined angle. In this arrangement, first printing is performed on one area on the optical disc 100 set on the turn table and then the turn table on which the optical disc 100 is set is turned through 180 degrees and stopped, and then second printing is performed on a different area from the first printing area on the optical disc 100. Provision of such turn table mechanism allows a printing area on the optical disc 100 to automatically align with the printer unit.

While in the embodiment the printing of a character string on the optical disc 100 parallel to the print L on the optical disc 100 has been described, some users may desire to print a title of character string at a predetermined angle to the direction of arrangement of characters of the print L. Means for satisfying the user's desire will be described next.

Figure 12:
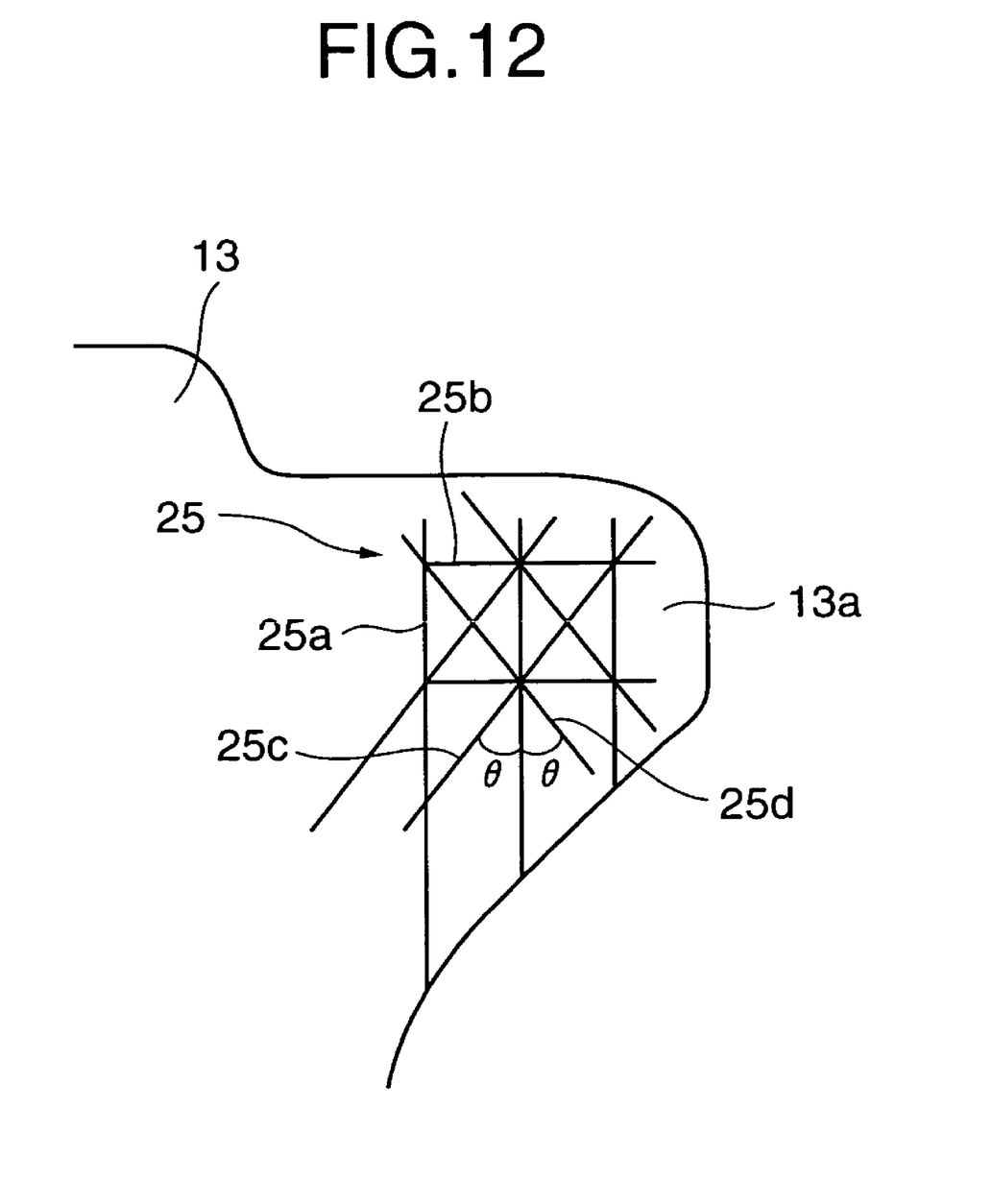
FIG. 12 illustrates an indicator marked on the aligning member.

FIG. 12 illustrates that the aligning portion 13a of the aligning member 13 has thereon vertical and horizontal reference line segments 25a and 25b, and inclined reference line segments 25c and 25d tilted at predetermined angles to the vertical and horizontal line segments. These inclined reference line segments 25c and 25d are at ±θ to the vertical reference line segments 25a. Thus, if the optical disc 100 is set on the tray 3 at such an angle such that the direction of arrangement of the characters of the print L on the disc 100 coincides with that of the inclined reference line segments 25c or 25d, a print area P is formed at the same angle as the inclined reference line segments 25c or 25d has to the direction of the print L.

In FIG. 12, the vertical, horizontal and inclined reference line segments 25a, 25b, 25c and 25d are marked in a mixing manner on the aligning member 13a and are difficult to discriminate from one another. Therefore, they are preferably printed in different colors. Alternatively, the respective reference line segments of the indicator 25 may be formed as slits or line-like protrusions in addition to printing.

This application is based upon Japanese Patent Application 2002-295040 filed Oct. 8, 2002 that includes the specification, claims, drawings and abstract that are incorporated herein.

INDUSTRIAL APPLICABILITY

As described above, according to the present invention a printer is provided that uses an aligning member having a simple structure to thereby adjust the position and direction of a print area on a recording medium to the specified reference ones and then print a desired character string to the print area on the recording medium.

The invention claimed is:

1. A printer comprising:
supporting means for supporting a recording medium, which is adapted to record data and which has a predetermined print thereon that is pre-printed by a manufacturer of the recording medium, the supporting means including a setting area at which the recording medium supported by the supporting means is set, and the supporting means being movable between a print position at which printing on the recording medium set at the setting area is possible and a setting/removing position at which the recording medium is settable on and removable from the supporting means;
printing means for printing in a printing area on the recording medium set in the setting area of the supporting means when the supporting means is at the print position;
an aligning member movable between an aligning position at which the aligning member partially overlaps with the setting area, and does not overlap at least with the printing area of the printing means, and a retracted position to which the aligning member is retracted from the setting area;
wherein the aligning member comprises an indicator as a reference of a position and a direction of the printing area of the printing means, and when the aligning member is at the aligning position, the indicator is adapted to be aligned with the predetermined print on the recording medium so as to align a desired area to be printed on the recording medium with the position and direction of the printing area of the printing means; and
wherein the aligning member moves with respect to the supporting means from the aligning position to the retracted position when the supporting means moves from the print position to the setting/removing position, and the aligning member is movable from the retracted position to the aligning position when the supporting means is positioned at the settable/removable position.

2. The printer according to claim 1, wherein the aligning member is slidable relative to the supporting means between the aligning position and the retracted position; and
wherein the aligning member comprises an engaging element that engages with a body of the printer when the supporting means moves from the print position toward the setting/removing position so as to stop movement of the aligning member with the supporting means, and the engaging element is movable relative to a body of the aligning member to be disengaged from the printer body when the aligning member is moved from the retracted position to the aligning position when the supporting means is at the setting/removing position.

3. The printer according to claim 2, wherein the engaging element comprises an elastic leaf spring that is engageable with the body of the printer.

4. The printer according to claim 1, wherein the aligning member is made of an optically transparent material.

5. The printer according to claim 1, wherein the indicator comprises at least one vertical or horizontal reference line segment.

6. The printer according to claim 1, wherein the indicator comprises at least one reference line segment that is inclined at a predetermined angle to the vertical or horizontal.

7. The printer according to claim 1, wherein the aligning member is made of an optically transparent material and comprises an aligning portion having the indicator formed thereon, the aligning portion being positioned such that, when the aligning member is at the aligning position, the aligning portion is disposed at a specified position a print on the recording medium or in a vicinity of the specified position.

8. The printer according to claim 7, wherein the indicator comprises at least one vertical or horizontal reference line segment.

9. The printer according to claim 7, wherein the indicator comprises at least one inclined reference line segment that is inclined at a predetermined angle to the vertical or horizontal.

* * * * *